2,966,491
N-PARA SUBSTITUTED-PHENYLETHYL-4-PHENYL-4-CARBALKOXY PIPERIDINES

Karl Pfister III and John Weijlard, Westfield, N.J., assignors to Merck & Co., Inc., Rahway, N.J., a corporation of New Jersey No Drawing. Filed Aug. 16, 1955, Ser. No. 528,829

7 Claims. (Cl. 260—294.3)

This invention relates to the production of 4-phenyl isonipecotate compounds and particularly to 1-(4-substituted phenylethyl) derivatives of 4-phenyl isonipecotate and to processes for preparing these compounds. These compounds have been found to possess analgesic activity.

This application is a continiation-in-part of our application Serial No. 518,970, filed June 29, 1955, now abandoned.

The 1-(4-substituted phenylethyl) derivatives of 4-phenyl isonipecotate are compounds having the structural formula—

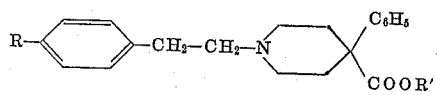

wherein R is hydroxy, chloro, iodo, bromo, nitro, amino, -O-alkyl, or

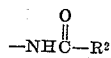

R' is a lower alkyl group, and $R^2$ is an alkyl, alicylic aryl or aralkyl group; and acid addition salts thereof. Of particular value are the compounds wherein the -O-alkyl group and the $R^2$ group contain from one to eight carbon atoms.

The chemical relationship of 1-(4-substituted phenyethyl) derivatives of 4-phenyl isonipecotate to the well-known analgesic, meperidine, is clear from a comparison of the foregoing formula with the structural formula of meperidine which is as follows:

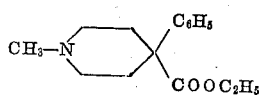

Although meperidine has been widely used as an analgesic, its toxicity has been a disadvantage in many instances. A large number of N-substituted analogues of meperidine have been prepared heretofore in the hope of obtaining a compound having comparable analgesic activity to meperidine and reduced toxicity, but none of the compounds thus prepared have offered a satisfactory substitute for meperidine. There was no reason to expect from this prior work that this line of investigation would lead to an improved analgesic of the meperidine type, since it was found that increasing the molecular size of the N-substituent actually increases the toxicity (e.g. ethyl-1-benzyl-4-phenyl-isonipecotate is reported to be about three to four times more toxic and to possess less than one-half the analgesic activity of meperidine).

The various 1-(4-substituted phenylethyl) derivatives of 4-phenyl isonipecotate are superior to meperidine in many ways. Some of the derivatives are less toxic, others are more potent as analgesics, and others are capable of oral administration.

The 1-(4-substituted phenylethyl) derivatives of 4-phenyl isonipecotate are prepared by reacting an acid salt of ethyl or methyl 4-phenyl isonipecotate (Compound II) with a β-(p-substituted phenyl)-ethyl halide (Compound I) thereby forming the corresponding 1-(4-substituted phenylethyl) derivative (Compound III). This reaction can be chemically represented as follows:

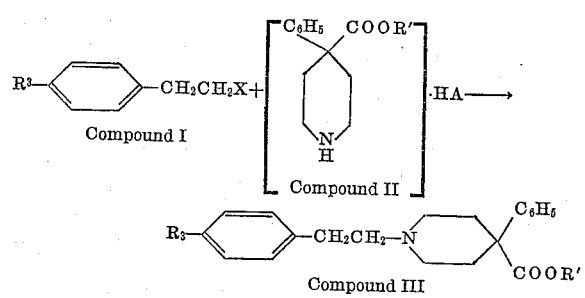

wherein HA is an acid, R' is as defined above. $R^3$ is hydroxy, chloro, iodo, bromo, nitro, amino or -O-alkyl, and X is a halogen. The 1-(4-substituted phenylethyl) derivatives of 4-phenyl isonipecotates (Compound III) can be reacted with an acid to produce the corresponding acid addition salt. The lower alkyl 1-(4-aminophenylethyl)-4-phenyl isonipecotate can be converted to the corresponding 1-(4-acylaminophenylethyl) derivative by reacting with an acylating agent. The N-acyl derivative can be isolated as the base or as its acid addition salt.

The reaction between the acid salt of lower alkyl 4-phenyl isonipecotate and the β-(p-substituted phenyl) ethyl halide is conveniently conducted by heating the reactants together in a liquid medium which is substantially inert under the reaction conditions and which is a solvent for the reactants. The liquid medium is preferably a lower alcohol such as methanol, ethanol, propanol and the like. The reaction is preferably conducted by heating the reactants together in the preferred liquid medium under reflux in the presence of an alkali metal bicarbonate such as sodium bicarbonate or potassium bicarbonate. Using the preferred reactants and reaction conditions the reaction is ordinarily substantially complete in about 24 to 48 hours. The 1-(4-substituted phenylethyl) derivative of the 4-phenyl isonipecotate thus formed is conveniently recovered from the reaction mixture by removing the inorganic salts by filtration and evaporating the resultant alcoholic solution to dryness in vacuo. The residual gummy mass is triturated with water, the water is decanted and the residual material is dried in vacuo to give the 1-(4-substituted phenylethyl) derivative of the 4-phenyl isonipecotate base.

The β-(p-substituted phenyl) ethyl halide starting material can be the chloride, bromide or iodide. In case of the p-amino compound it is preferred to employ an acid salt of either the bromide or the chloride such as the sulfate, phosphate, hydro-bromide or hydro-chloride. Typical examples of other compounds are β-(p-hydroxyphenyl)-ethyl bromide, β-(p-methoxyphenyl)-ethyl bromide, β-(p-ethoxyphenyl)-ethyl bromide, β-(p-propoxyphenyl)-ethyl bromide, β-(p-chlorophenyl)-ethyl bromide, β-(p-iodophenyl)-ethyl bromide, β-(p-bromophenyl)-ethyl bromide, β-(p-nitrophenyl)-ethyl bromide and β-(p-aminophenyl)-ethyl bromide.

The lower alkyl 1-(4-aminophenylethyl)-4-aryl isonipecotate can be reacted with an acylating agent thereby monoacylating the primary amino substituent to form the corresponding lower alkyl 1-(4-acylaminophenylethyl)-4-phenylisonipecotate. Suitable acylating agents are acid halides such as the acid chlorides, acid anhydrides, and others with the acid anhydride being preferred, the acylating agent containing the acyl residue of an organic carboxylic acid, especially those containing from one to eight carbon atoms inclusive. Among such acids are formic, acetic, propionic, butyric, valeric, hexanoic, heptanoic, octanoic, cyclopentanecarboxylic, cyclopentylpropionic, benzoic, toluic, oxalic and the like. The acids can also contain substituents, such as halogen, alkyl, methoxy and others which are non-reactive under the reaction conditions employed.

Typical examples of the compounds produced are ethyl 1-(4-acetyl aminophenylethyl) - 4 - phenyl isonipecotate, ethyl 1-(4-propionylaminophenylethyl) - 4 - phenyl isonipecotate, propyl 1 - (3 - acetylaminophenylethyl) - 4 - phenyl isonipecotate, ethyl 1-(4-benzoylaminophenylethyl) - 4 - phenyl isonipecotate, methyl 1-(4 - cyclopentanecarboxylaminophenylethyl)-4-phenylisonipecotate, and the like. The acylation is ordinarily carried out in solution in an inert solvent under substantially anhydrous conditions. For example, when utilizing a lower alkanoic anhydride, such as acetic anhydride, the reaction is conveniently carried out in glacial acetic acid medium. The acylation can be carried out at room temperature or at elevated temperatures of about 100° C. under which conditions the reaction is ordinarily complete in about one hour. The product is conveniently recovered from the reaction mixture by diluting the latter with water and neutralizing the acidic components with sodium carbonate, sodium bicarbonate or the like whereupon the acylated product precipitates as a gum which is readily separated from the aqueous layer by decantation. This gummy material is further purified by washing in water and drying in vacuo.

The lower alkyl 1-(4-substituted phenyl ethyl)-4-phenyl isonipecotate is converted to the corresponding mono- or di-acid addition salt by reacting with an acid, particularly the mineral acids, as for example hydrochloric, hydrobromic, sulfuric and the like acids under substantially anhydrous conditions. This salt-forming reaction is conveniently carried out in a medium comprising a lower alkanol, such as methanol, ethanol, propanol and the like. Upon diluting the alkanol reaction medium with ether there precipitates the corresponding acid salt. The salt thus formed can be recovered from the alcoholic slurry by filtration or centrifugation.

The compounds of this invention can be further substituted in the 4-phenyl group and/or in the isonipecotate medium in a manner known in the art not to interfere with the analgesic activity of the compound as a whole. Typical of this type of substitution is hydroxy, lower alkyl, and alkoxy substituents attached to these groups such as in the 3-position in the 4-phenyl group and the 3-position in the isonipecotate nucleus. Such compound would be for example ethyl 1-(4-aminophenylethyl) - 3 - methyl-4-phenyl isonipecotate and ethyl 1-(4-aminophenylethyl)-4-(3-hydroxyphenyl) isonipecotate.

The following examples are given for the purpose of illustration.

Example 1

A mixture of 7.8 g. (0.05 mole) of β-(p-aminophenyl) ethyl chloride hydrochloride, 12.5 g. (0.025 mole) of ethyl 4-phenyl-isonipecotate carbonate, 10.5 g. (0.125 mole) sodium bicarbonate, and 100 cc. of anhydrous ethanol are mixed, stirred and heated under reflux for a period of approximately 40 hours, and then concentrated in vacuo to dryness. The residual material is triturated with 50 cc. of water, decanted, washed by decantation with an additional 50 cc. of water, and then dried in vacuo to give ethyl 1-(4-aminophenylethyl)-4-phenyl isonipecotate.

The ethyl 1-(4-aminophenylethyl)-4-phenyl isonipecotate carboethoxypiperidine is dissolved in 50 cc. of hot anhydrous ethanol, an excess (about 20 cc.) of 20% alcoholic hydrochloric acid solution is added; upon scratching the side of the container crystals form. One hundred cubic centimeters of ether are then added to the mixture, the ethereal mixture is cooled, and the crystalline material which precipitates is recovered by filtration, washed with ether, and dried to give 12.7 g. of ethyl 1-(4-aminophenylethlyl) - 4 - phenyl isonipecotate dihydrochloride which can be further purified by recrystallization from ethanol or methanol to give substantially pure material; M.P. 275–277° C. Calc'd. for $C_{22}H_{28}O_2N_2 \cdot 2HCl$; C, 62.12; H, 7.11; N, 6.59; Cl, 16.67. Found: C, 61.75; H, 6.90; N. 8.48; Cl, 16.60.

The β-(p-aminophenyl)ethyl chloride hydrochloride used as starting material in the foregoing example may be prepared as follows: A mixture of 111 g. acetic anhydride and 66 g. of acetic acid is cooled to 0° C., 69 g. of fuming nitric acid is added slowly, and the mixture is cooled to —5° C. To the cold mixture thus obtained is added dropwise with stirring 101 g. β-phenylethyl bromide over a period of about two hours while maintaining the temperature of the mixture between about —10 and 0° C. The nitration mixture is stirred for an additional two-three hours at a temperature below 0° C., and the reaction mixture is poured into a suspension of 145 g. sodium carbonate in 1100 cc. ice water. The yellow product is extracted from the aqueous mixture with benzene, the benzene extract is washed with excess sodium bicarbonate solution, then with water, and then dried over magnesium sulfate. The benzene is evaporated from the resulting solution in vacuo, and the residual material is crystallized from petroleum ether to give about 55 g. of β-(p-nitrophenyl)ethyl bromide; M.P. 65–67° C. To a solution containing 172 g. stannous chloride in 430 cc. concentrated aqueous hydrochloric acid is added portionwise with shaking 43 g. of β-(p-nitrophenyl)ethyl bromide over a period of about 45 minutes. The resulting mixture is warmed for an additional 45 minutes on a steam bath, and the aqueous solution is decanted from some oily material. The resulting solution is cooled, 750 cc. of a 30% aqueous sodium hydroxide solution is added, and the resulting cold aqueous alkaline solution is extracted with 400 cc. of ether and then with two 200 cc. portions of ether. The combined ether extracts are washed with two 300 cc. portions of water and the washed ether solution is shaken with 95 cc. of 3.5 N aqueous hydrochloric acid solution whereupon crystallization takes place immediately. The crystalline slurry is cooled to about 0° C., allowed to stand to complete crystallization, the slurry is filtered, and the crystals are washed with three 25 cc. portions of ice water and dried in vacuo to give about 30 g. of a mixture of β-(p-aminophenyl)ethyl bromide hydrochloride and β-(p-aminophenyl)ethyl chloride hydrochloride.

Example 2

One gram of ethyl 1-(4-aminophenylethyl)-4-phenyl isonipecotate dihydrochloride prepared as described in Example 1 hereinabove is dissolved in 25 cc. of water, excess sodium hydroxide solution is added, and the aqueous alkaline mixture is extracted with two 50 cc.-portions of ether. The ether extracts are combined, dried over magnesium sulfate, and evaporated to dryness in vacuo to give ethyl 1-(4-aminophenylethyl)-4-phenyl isonipecotate base. This material is mixed with 2 cc. glacial acetic acid and 2 cc. of acetic anhydride, and the resulting mixture is heated on the steam bath for a period of about one hour, and then allowed to stand overnight at room temperature. The reaction mixture is diluted with 25 cc. of water, an excess of sodium bicarbonate is added portionwise whereupon a gummy precipitate forms. The aqueous layer is decanted from this precipitate and the latter is washed by decantation with three 15 cc.-portions of water, and dried in vacuo to give ethyl 1-(4-acetylaminophenylethyl)-4-phenyl isonipecotate base.

The ethyl 1-(4-acetylaminophenylethyl)-4-phenyl isonipecotate base is dissolved in 10 cc. of anhydrous ethanol, a trace of salt which forms is removed by filtration and to the filtered solution is added an excess (2 cc.) of 20% alcoholic hydrochloric acid solution. Crystallization occurs immediately, the crystalline slurry is cooled to 0° C. and filtered, and the crystalline material is washed with four 3 cc.-portions of cold anhydrous ethanol and dried to give about 0.5 g. of ethyl 1-(4-acetylaminophenylethyl)-4-phenyl isonipecotate hydrochloride; M.P. 264–265° C. Calc'd. for $C_{24}H_{30}O_3N_2 \cdot HCl$: C, 66.88; H, 7.25; N, 6.50. Found: C, 67.18; H, 7.57; N, 6.39.

*Example 3*

To a solution of 1.8 g. (0.005 mole) of purified ethyl 1-(4-aminophenylethyl)-4-phenyl isonipecotate in 10 cc. of anhydrous ethanol is added 8.2 cc. of 2.23 ethanolic hydrogen chloride (0.005 mole). The mixture is chilled at about 0° C. overnight. The crystals of ethyl 1-(4-aminophenylethyl)-4-phenyl isonipecotate monohydrochloride thus obtained are filtered, washed with 3 cc. portions of ice-cold anhydrous ethanol and dried. 1.0 g. of product is obtained, M.P. 218–220° C. Calc'd. for $C_{22}H_{28}O_2N_2 \cdot HCl$: C, 67.96; H, 7.54; N, 7.20. Found: C, 67.79; H, 7.23; N, 7.39.

*Example 4*

Two and one-tenth grams of ethyl 1-(4-aminophenylethyl)-4-phenyl isonipecotate is heated under reflux for two hours in methanol solution containing a slight excess of potassium hydroxide. The reaction mixture is evaporated to dryness in vacuo. The residual material is dissolved in 50 ml. of methanol; the methanolic solution is saturated with hydrogen chloride, and the resulting solution is allowed to stand at room temperature for a period of about twelve hours. The reaction mixture is evaporated to dryness in vacuo, and the residual material is dissolved in 50 ml. of water and treated with a slight excess of alkali. The aqueous alkaline solution is extracted with ether, the ethereal extract is dried over anhydrous magnesium sulfate, and the ether may be evaporated therefrom to give methyl 1-(4-aminophenylethyl)-4-phenyl isonipecotate base. Alternatively, hydrogen chloride gas is added to the dry ether solution, and the precipitated material is recovered by filtration and recrystallized from methanol to give substantially pure dihydrochloride salt; M.P. 284–285° C.

*Example 5*

Three and eight-tenths grams of ethyl 4-phenyl isonipecotate carbonate, 3.1 grams of β-(p-hydroxyphenyl) ethyl chloride, 2.3 grams of sodium bicarbonate and 35 cc. of anhydrous ethanol were mixed, stirred and refluxed for 44 hours. The solution was filtered and the solid washed three times with 15 cc. of anhydrous ethanol, then concentrated in vacuo to a crystalline mush. The residue was treated with 45 cc. water. The crystals were filtered, washed with water and dried in vacuo to yield 4.5 grams of ethyl 1-(4-hydroxyphenylethyl)-4-phenyl isonipecotate base.

The ethyl 1-(4-hydroxyphenylethyl)-4-phenyl isonipecotate base was dissolved in about 20 cc. of hot anhydrous ethanol, alcoholic hydrochloride was added in excess, then 200 cc. of anhydrous ether was added and chilled to 0° C. The crude ethyl 1-(4-hydroxyphenylethyl)-4-phenyl isonipecotate hydrochloride was filtered off and washed with ether, then recrystallized by dissolving in 22 cc. of hot anhydrous ethanol, adding a pinch of Darco, filtering and washing the black with 2 cc. of hot anhydrous ethanol, then chilling, to −5° C. The crystals were collected, washed with a few cc. of ice cold anhydrous ethanol and dried in vacuo over sulfuric acid. M.P. 211–212° C.

The starting material was prepared as follows: Twelve grams (0.05 mole) β-(p-aminophenyl)ethylhalogen hydrochloride was dissolved in 100 cc. water in a flask equipped with stirrer, thermometer and dropping funnel. The the solution was added 13 cc. 50% sulfuric acid and warmed to 55° C. then a solution of 4.1 gm. (0.06 mole) sodium nitrite in 25 cc. water was added at 60–70° C. over a period of 15 minutes; the mixture was stirred another 15 minutes at 70–75° C. then cooled. The product was extracted three times with 75 cc. ether, the combined ether extracts were dried over magnesium sulfate, the ether was distilled off, then the product distilled at 118–130° C. 1.5 mm. Yield 6.0 gm. Calc'd. for $C_8H_9OCl$: C, 61.35; H, 5.79. Found: C, 60.35; H, 5.37; Br, shows slightly.

*Example 6*

Seven and one-half grams of β-(p-methoxyphenyl)ethylchloride, 10.2 grams of ethyl 4-phenyl isonipecotate carbonate, 9.2 grams of sodium bicarbonate and 100 cc. of anhydrous ethanol are mixed and refluxed 40 hours, then filtered and concentrated in vacuo to dryness. The residue was dissolved in 100 cc. of ether, the ether solution washed with 100 cc. of water, the water back extracted with 50 cc. of ether. The ether solution was concentrated to dryness to yield ethyl 1-(4-methoxyphenylethyl)-4-phenyl isonipecotate base.

The ethyl 1-(4-methoxyphenylethyl)-4-phenyl isonipecotate base is dissolved in hot ether, dried over magnesium sulfate and hydrogen chloride gas was added in excess. Yield 12.5 grams crude hydrochloride, M.P. 70–100° C. The crude was dissolved in 50 cc. of hot anhydrous ethanol, added Darco, filtered and washed with 5 cc. hot anhydrous ethanol. To the clear alcoholic filtrate was added 165 cc. ether and chilled at 0° C. overnight. The crystals were collected, washed four times with 20 cc. of ether and air dried. Yield 5.7 grams first crop, M.P. 185–187° C. The filtrate was concentrated in vacuo to dryness, the residue dissolved in 15 cc. of anhydrous ethanol, 60 cc. ether was added, chilled and concentrated to dryness. Yield 0.9 gram, M.P. 183–185° C. Total yield 6.6 grams of ethyl 1-(4-methoxyphenylethyl)-4-phenyl isonipecotate hydrochloride.

The starting material was prepared as follows:

β-(p-Hydroxyphenyl)ethyl chloride, 7.9 gm. ≃ 0.05 mole was dissolved in a solution of 8gm. (0.2 mole) NaOH in 50 cc. water, in a 250 cc. flask equipped with stirrer, thermometer, reflux condenser and dropping funnel, 11.3 gm. (0.09 mole) dimethylsulfate was added dropwise while cooling with ice to keep the temperature below 15° C. Stirring was continued for 15 minutes at 15–20° C. then another portion of 11.3 gm. dimethylsulfate was added dropwise without cooling, allowing the temperature to rise to 60° The mixture was now heated up to 100° C. and stirred at 100° C. for 10 minutes. The reaction was still strongly alkaline. After cooling to room temperature the product was extracted with 3 x 50 cc. ether. The combined ether extracts were washed with 50 cc. water and dried over magnesium sulfate. The ether was distilled off in vacuo and the residue held in vacuo to constant weight. Yield 7.6 gm. (89% of theory), a mobile oil. Calcd. for $C_9H_{11}OCl$: C, 63.36; H, 6.49; Cl, 20.78. Found: C, 63.46; H, 6.18; Cl, 20.66.

*Example 7*

A mixture of β-(p-nitrophenyl) ethyl bromide, (6.9 grams), 7.6 grams of ethyl 4-phenyl isonipecotate carbonate, 6.5 grams of sodium bicarbonate and 75 cc. of anhydrous ethanol were stirred and refluxed for 40 hours. The hot solution was filtered and the salts washed with alcohol several times, then concentrated in vacuo to dryness. The crystalline residue was triturated with 50 cc. water, filtered, washed four times with 10 cc. of water and dried in vacuo to yield ethyl 1-(4-nitrophenylethyl)-4-phenyl isonipecotate base.

The ethyl 1-(4-nitrophenylethyl)-4-phenyl isonipecotate base was dissolved in 30 cc. of anhydrous ethanol, 6 cc. of 20% alcoholic hydrogen chloride (an excess) was added followed by 60 cc. of ether which produced a crystalline precipitate. The crystals were collected, washed with ether and air dried. Yield 10 grams of crude ethyl 1-(4-nitrophenylethyl)-4-phenyl isonipecotate hydrochloride, M.P. 217–219° C. The product was dissolved in 150 cc. hot anhydrous ethanol, filtered to remove fibres and chilled at 0° C. overnight. The crystals were filtered off, washed four times with 10 cc. of ice cold anhydrous ethanol and air dried at 50° C. Yield 9.3 M.P. 218–220° C.

The starting material was prepared as follows:

A mixture of 111 gm. (1.092 moles) acetic anhydride and 66 gm. (1.092 moles) acetic acid was chilled to 0° C. in a 1 liter flask equipped with stirrer, thermometer and dropping funnel. Fuming nitric acid (69 gm., about 1.09 moles) was added slowly, then the mixture was chilled to −5° C. and 101 gm. (0.546 mole) β-phenylethyl bromide was added from the dropping funnel at −10 to 0° over a period of 2 hours. The stirring was continued another 2.5 hours below 0° C., then the reaction mixture was poured into a suspension of 145 gm. $Na_2CO_3$ in 1100 cc. ice+water. The yellow product was extracted with 400+200 cc. benzene, the combined benzene extracts were washed with excess $NaHCO_3$ solution, then water, then dried over $MgSO_4$. The benzene was distilled off in vacuo and the residue was dissolved in 1600 cc. pet. ether. On scratching and agitation the p-compound crystallized out. The crystals were collected at room temperature, washed with pet. ether and air dried. Yield 55 gm. p-nitrophenylethylbromide (44% of theory), M.P. 65–67° C. Calcd. for $C_8H_8O_2NBr$: N, 6.09. Found: N, 6.13.

The filtrate and washes were concentrated in vacuo to dryness and the residue was distilled in vacuo. Yield 50.9 gm. (40.7%) of the o-nitrophenylethylbromide, an oil distilling at 112–120° C. 0.2 mm.

Example 8

Eleven and four-tenths grams of β-(p-chlorophenyl) ethylchloride, 15.3 grams of ethyl 4-phenyl isonipecotate carbonate, 13.5 grams sodium bicarbonate and 150 cc. of anhydrous ethanol were mixed and refluxed for 40 hours, then filtered and concentrated. The residual oil was dissolved in a mixture of 100 cc. of ether and 100 cc. water, the separated water layer was extracted with 50 cc. ether, and the combined ether solutions dried over magnesium sulfate. The ether solution was concentrated to dryness to yield ethyl 1-(4-chlorophenylethyl)-4-phenyl isonipecotate base.

The ethyl 1-(4-chlorophenylethyl)-4-phenyl isonipecotate base was dissolved in hot ether and excess hydrogen chloride gas was passed in, the crystals were filtered off, washed with ether and dried in vacuo. Yield of crude ethyl 1-(4-chlorophenylethyl)-4-phenyl isonipecotate hydrochloride, M.P. 185–200° C. The crude hydrochloride was dissolved in 150 cc. hot anhydrous ethanol and the solution chilled at 0° C. overnight, the crystals were collected, washed twice with 15 cc. of ice cold anhydrous ethanol, then ether, and dried. Overall yield 53%, M.P. of 213–215° C.

The starting material was prepared as follows:

β-(p-Aminophenyl)ethyl chloride-bromide hydrochloride mixture, 19.2 gm.=about 0.1 mole was dissolved in 25 cc. water, 25 cc. conc. HCl was added followed by 100 gm. crushed ice. A solution of 7.2 gm. (0.105 mole) $NaNO_2$ in 25 cc. water was added dropwise at 0 to 3° C. in about 15 minutes. The mixture was allowed to age for 10 minutes in the ice bath, then the cold diazonium solution was added dropwise to a solution of 12.5 gm. (0.125 mole) CuCl in 50 cc. water+50 cc. conc. HCl at 45–50° C. with stirring over a period of 25 minutes. The mixture was stirred another 10 minutes at 50°, then at 90–95° C. for 15 minutes. The cooled solution was extracted with 3 x 100 cc. ether; the combined ether extracts were washed with water, then sodium bicarbonate solution and finally dried over magnesium sulfate. The ether was distilled in vacuo and the residual oil was distilled at 80–85° C. 0.5 mm. Yield 11.5 gm. (66% of theory), a water white oil. Calcd. for $C_8H_8Cl_2$: C, 54.87; H, 4.60. Found: C, 55.19; H, 4.32.

Example 9

Eight grams of β-(p-N-methylaminophenyl)ethyl chloride hydrochloride, 10 g. (0.02 mole) ethyl 4-phenyl isonipecotate carbonate, 150 cc. anhydrous ethanol and 14 g. (0.16 mole) sodium bicarbonate were mixed, stirred and refluxed for 40 hours. The reaction mixture was concentrated to dryness in vacuo, the residue mixed with 100 cc. water and extracted with 3 x 50 cc. ether. The combined ether extracts were dried over magnesium sulfate and concentrated to dryness to yield ethyl 1-(4-methylaminophenylethyl)-4-phenyl isonipecotate base. To the base in ether solution hydrogen chloride gas was passed in and the precipitated hydrochloride stirred until crystalline, then filtered, washed with ether and dried in vacuo. The product was dissolved in 50 cc. isopropanol, 100 cc. ethyl acetate was added followed by 150 cc. ether and cooled to 5°. The ethyl 1-(4-methylaminophenylethyl)-4-phenyl isonipecotate hydrochloride was filtered, washed several times with ether and dried in vacuo.

The starting material was prepared as follows:

β-(p-Aminophenyl)ethyl chloride hydrochloride (19.2 g., 0.1 mole) was dissolved in 200 cc. anhydrous ethanol, 8 g. 37% formaldehyde (0.1 mole) was added and warmed on the steam bath to 65–70° C. After an hour's standing 20 cc. 20% alcoholic HCl was added followed by 0.5 g. $PtO_2$, and reduced at an initial pressure of 50 lbs. About 80% theoretical hydrogen was absorbed in 24 hours, then the reduction stopped.

The catalyst was filtered off and the solution was concentrated in vacuo to dryness (19.5 g.). The amorphous residue was triturated with water (unchanged aminophenethyl chloride hydrochloride dissolves in water 1:5), stirring vigorously; on cooling to 5° the soft, oily mass hardened so the water could be poured off. The residue was washed with 2 x 25 cc. water by decantation, then dissolved in 75 cc. methanol and concentrated in vacuo to dryness to remove moisture. The alcohol treatment was repeated once more and the final residue held at 1 mm. to constant weight. Yield 8.0 g. product, brittle masses melting at about 100° C.

The combined aqueous washes were made alkaline, the precipitated base was extracted with ether and the ether was removed in vacuo. Recovered thus 7.2 g. unchanged β-(p-aminophenyl)ethyl chloride.

On basis of used-up starting material the yield of the N-methyl compound was 73% of theory; the direct yield, however, was only 40%.

Any departure from the above description which conforms to the present invention is intended to be included within the scope of the claims.

What is claimed is:

1. A compound selected from the group consisting of compounds having the formula

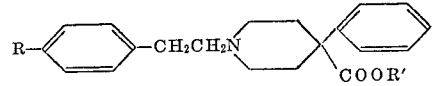

wherein R is selected from the group consisting of hydroxy, chloro, iodo, bromo, nitro, -o-lower alkyl, and —NH—R′, and R′ is a lower alkyl group; and acid addition salts thereof.

2. Ethyl 1-(4-hydroxyphenylethyl)-4-phenyl isonipecotate hydrochloride.

3. Ethyl 1-(4-methoxyphenylethyl)-4-phenyl isonipecotate hydrochloride.

4. Ethyl 1-(4-nitrophenylethyl)-4-phenyl isonipecotate hydrochloride.

5. Ethyl 1-(4-chlorophenylethyl)-4-phenyl isonipecotate hydrochloride.

6. N-[β-(p-nitrophenyl)ethyl]-4-phenyl-4-carboethoxy-piperidine having the formula:
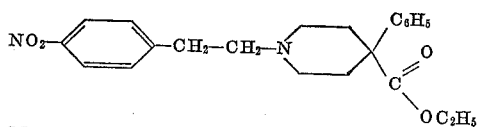
7. N-[β-(p-methoxyphenyl)ethyl]-4-phenyl-4-carboethoxypiperidine having the formula:
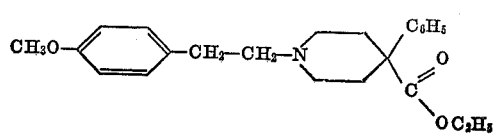
References Cited in the file of this patent
UNITED STATES PATENTS
| | | |
|---|---|---|
| 2,167,351 | Eisleb | July 25, 1939 |
| 2,486,795 | Kaegi | Nov. 1, 1949 |
| 2,748,140 | Schmidle et al. | May 29, 1956 |
| 2,784,192 | Schmidle et al. | Mar. 5, 1957 |
| 2,794,810 | Cusic | June 4, 1957 |
OTHER REFERENCES
Simons: Industrial and Engineering Chemistry, vol. 39, p. 238 (1947).